Aug. 3, 1965
R. A. PHANEUF ETAL
3,198,059
FIBER ENERGY CONDUCTING DEVICE HAVING
A HEAT SHRUNKEN TUBULAR FITTING
Filed Feb. 8, 1960
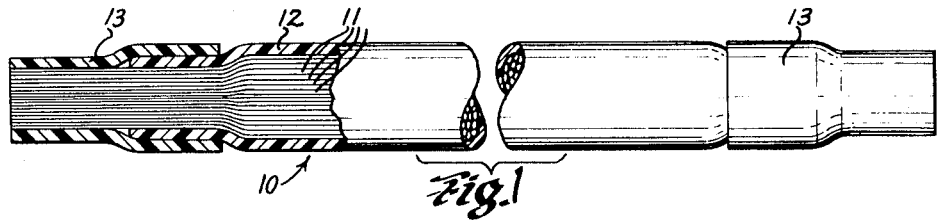
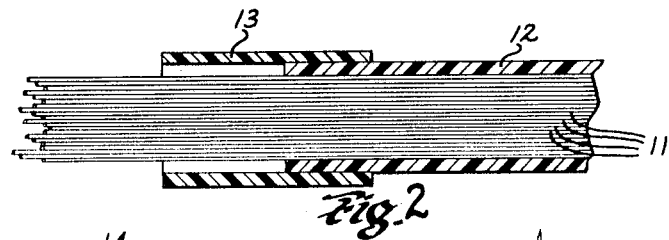
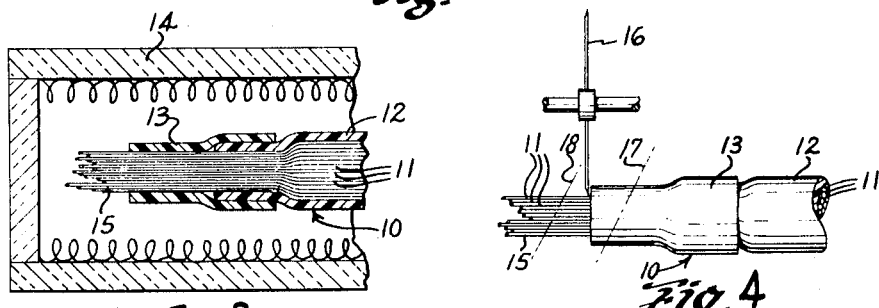
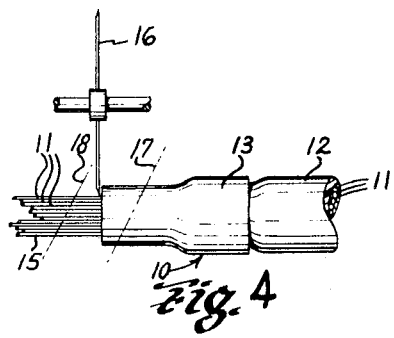
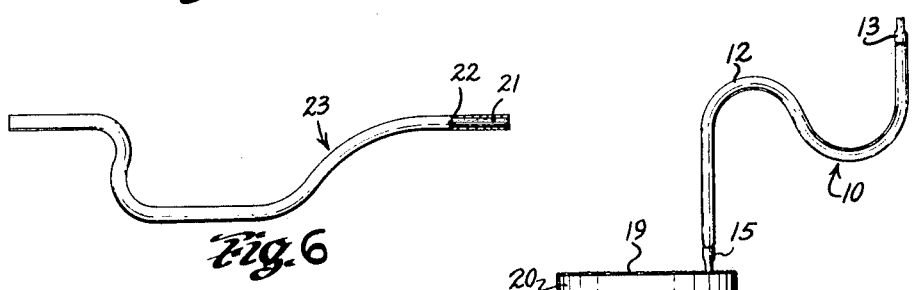
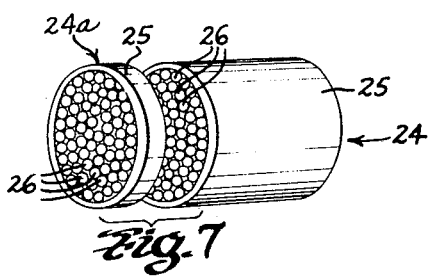
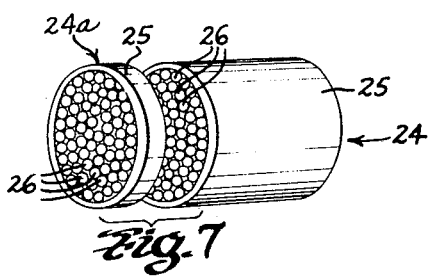
INVENTORS
ROLAND A. PHANEUF
WILFRED P. BAZINET, JR
BY
Louis L. Gagnon
ATTORNEY

United States Patent Office 3,198,059
Patented Aug. 3, 1965

3,198,059
FIBER ENERGY CONDUCTING DEVICE HAVING A HEAT SHRUNKEN TUBULAR FITTING
Roland A. Phaneuf, Sturbridge, and Wilfred P. Bazinet, Jr., Webster, Mass., assignors to American Optical Company, Southbridge, Mass., a voluntary association of Massachusetts
Filed Feb. 8, 1960, Ser. No. 7,436
2 Claims. (Cl. 88—1)

This invention relates to improvements in light-conducting devices of the type embodying a group of light-conducting fibers assembled together in side-by-side relation with each other for transferring light from one end of said assembly to the other and has particular reference to the provision of novel means for permanently retaining the fibers in said assembled relation.

In using a fiber light-conducting device which embodies an assembly of many elongated relatively fine fibers, it is usually necessary to provide an end fitting or means of some sort on at least one end of the assembly of fibers to hold the fibers securely in compact side-by-side relation with each other and/or to provide means by which the device can be readily attached or otherwise adapted to apparatus with which it is to be used.

Elongated bundles of fibers which are more commonly referred to as fiber "light pipes" are usually provided with means at each end thereof to secure the fibers together in compact side-by-side relation with each other so as to reduce the cross-sectional size of the bundle to a minimum at its ends while allowing the fibers to flex freely and individually intermediate their opposite ends.

Heretofore, end fittings for fiber light pipes or the like have been relatively complicated, difficult to apply without causing damage to the light-conducting fibers and were often relatively insecure. Furthermore, in many cases, the cost of conventional end fittings and time-consuming fiber assembly procedures for forming light pipes or the like inhibits the use of such fiber optical devices in applications where considerable advantage would be gained by their use, provided they could be supplied economically.

In other types of fiber optical devices such as face plates or the like embodying relatively large bundles of short light-conducting fibers in compact side-by-side relation with each other, there has also been a need for simple, quick and economical means and method of fabrication to permit a more extended usage of such devices, particularly in applications where economy of construction is of prime importance.

The present invention provides for the manufacture of fiber light-conducting devices of the above character in a quick simple and economical manner and, accordingly, it is a principal object of this invention to provide novel and improved light-conducting devices of the type embodying a plurality of fiber-like light-conducting elements in bundled side-by-side relation with each other and novel means for making the same.

Another object is to provide improved fittings for fiber bundles which are so characterized as to function as means to urge and retain the fibers into compact interfitting side-by-side relation with each other when applied to the bundles and to subsequently provide permanent protective sheath-like means for said fibers.

Another object is to provide protective sheath-like fittings for fiber light-conducting devices of the above character which are formed of a dilated plastic tubular material so characterized as to shrink under controlled temperatures into permanent gripping relation with the fibers of said devices to which said fittings are applied.

Other objects and advantages of the invention will become apparent from the following description when taken in conjunction with the accompanying drawings in which:

FIG. 1 is an enlarged side elevational view shown partially in cross-section of a fiber light-conducting device which has been formed in accordance with the method of the invention;

FIG. 2 is a fragmentary longitudinal cross-sectional view illustrating an intitial step in the method of forming a device such as shown in FIG. 1;

FIGS. 3, 4 and 5 are diagrammatic illustrations of subsequent method steps used in the forming of devices such as shown in FIG. 1;

FIG. 6 illustrates a modified form of the device shown in FIG. 1 and;

FIG. 7 is a still further modification of the invention which may be formed in accordance with the method herein disclosed.

In referring more particularly to the drawings, it will be seen that the device 10 of FIG. 1 embodies a plurality of elongated light-conducting fibers 11 groups in side-by-side relation with each other to provide means by which light entering the group of fibers 11 at one end of the device will be transferred or piped to the opposite end thereof. Devices of this type are commonly referred to as "light pipes" and the individual fibers 11 thereof are usually light-insulated from each other by a thin cladding material which surrounds the central or core parts of each of the fibers. Light-conducting fibers of this type may be formed of various plastic materials but, in general, optical glasses produce the best fibers and are preferred.

While the actual details of construction of the fibers 11 forms no part of this invention, it is pointed out that, as an example, a desirable clad fiber might embody a core part of an optical flint glass having an index of refraction of approximately 1.75, with a thin outer cladding thereon of a crown or soda-lime glass having an index of refraction of approximately 1.52. Light entering endwise into a fiber 11 from a direction within the particular aperture or light-acceptance angle of the fiber is transferred therethrough to its opposite end by internal reflection which takes place at the interface between the respective core and cladding parts of the fiber.

Referring more specifically to the features of the invention which relate to the fabrication of light pipes, such as shown in FIGS. 1–5 or other similar devices to be discussed hereinafter, it can be seen that the device of FIG. 1, in addition to the fibers 11, embodies an outer protective sheath 12 of plastic material or the like extending throughout the major portion of the length of the fibers. The sheath 12 is preferably formed of polyvinyl chloride tubing having an inner diameter such as to relatively loosely receive a desired number of fibers 11 and of controlled length such as to permit the fibers 11 to protrude outwardly beyond the terminal ends of said sheath 12.

Over each of the opposite ends of the sheath 12 and covering the protruding ends of the fibers 11, there is provided a fitting 13 formed of an initially dilated polyvinyl chloride tubing or the like which is shrunken onto the sheath 12 and fibers 11, as illustrated, to compact the fibers 11 at the ends of the device 10 by squeezing them into interfitted side-by-side relation with each other as will be described.

The material of the fittings is preselected in accordance with the cross-sectional size of the group of fibers and the amount of shrinkage desired thereof. In this respect, the extent to which a polyvinyl chloride tube is dilated will determine the extent to which it will shrink when subjected to a precontrolled heat. For example, dilated polyvinyl chloride tubes having a wall thickness of approximately .030″ and an initial inside diameter of approximately .137″ which will shrink to an inside diameter of approximately .062″ when heated to temperatures ranging from 170° F. to 250° F. for 30 seconds or more would be suitable for use with a fiber bundle having a cross-sectional diameter greater than that to which the inside diameter of the fitting may be shrunk. It should be understood that similar tubes of various other sizes may be used in accordance with the number and size of fibers used.

Once in place, as shown in FIG. 1, the fittings 13 serve to permanently hold the fibers securely in compact relation with each other and further offer means by which the device 10 can be coupled or otherwise attached to apparatus with which it is intended to be used without, in any way, disrupting or damaging the fibers.

In forming the assembly of FIG. 1, the sheath 12 is selected to have an inner diameter such as to receive a relatively loosely bundled array of fibers which may or may not be precisely aligned in end-to-end relation with each other, see FIG. 2, and the fibers 11 are inserted through the sheath 12 preferably as a group, in such manner as to allow the opposite ends thereof to protrdue well beyond the terminal ends of the sheath 12. The relative lengths of the sheath and fibers are so preselected as to permit this protrusion of the fibers.

The protruding ends of the fibers 11 are next dipped or otherwise coated with a liquefied adhesive material such as an epoxy resin or the like in liquid or flowable state and a tubular fitting 13 of dilated polyvinyl chloride or the like having an inner diameter such as to fit easily over the sheath 12 is slipped into place at each end of the sheath 12 substantially as shown in FIG. 2. The complete assembly, or at least the ends thereof now having the fittings 13 thereon are placed in heating means 14, such as shown diagrammatically in FIG. 3, whereupon the fittings are heated rapidly to a temperature sufficient to cause them to shrink into place and produce a compacting of the fibers.

It has been found that a temperature of approximately 200° F. for a time period of 30 seconds will produce the desired results when the fittings are formed of a dilated polyvinyl chloride tubing. During the shrinking of the fittings 13, the liquefied adhesive material between the fibers acts as lubricating means allowing the fibers to slide freely relative to and against each other into compact side-by-side interfitting relation with each other. It is pointed out that the time cycle of heating required for proper shrinking of the fittings is controlled to be of shorter duration than that required to cure or harden the above-mentioned adhesive material. In this way, throughout the complete period of shrinking of the fittings 13, the adhesive material remains fluid and acts as a lubricant. However, after the fibers 11 have been squeezed into place, the adhesive material hardens or becomes completely cured to form a tight bond between the compacted ends of the array of fibers 11. Also, when cooled, the fittings remain tightly and securely in place, as shown in FIGS. 1 and 3.

In order to assure that the fittings 13 will be in tight gripping relation with the bundle of fibers 11 after shrinking, the particular dilated tubing from which the fittings 13 are made is preselected so as to be capable of shrinking to a smaller inside diameter than that of the outer size of the completely compacted end of the bundle of fibers. In this way, during the shrinking of the fittings, their tendency to continue shrinking beyond the limitation imposed thereon by the outer size of the completely compacted bundle of fibers 11 will produce the tight gripping action desired of the fittings 13. The above-mentioned epoxy resin or adhesive material on the fibers 11 will also form a tight seal between the fittings 13 and fibers 11 regardless of the cross-sectional shape of the fibers themselves. It should be understood that fibers of any desired cross-sectional shape such as round, square, hexagonal or the like can be used in the fabrication devices of the character shown and described herein and the adhesive material will fill all voids between the fibers to form a substantially hermetically sealed encapsulation of the fibers 11.

When the assembly of fibers 11, sheath 12 and fittings 13 is completed and removed from the furnace 14, and after the parts thereof have cooled sufficiently to set or harden the adhesive therein, the ends 15 of the fibers 11 (see FIGS. 3 and 4) which protrude beyond the fittings 13 are cut away adjacent the fittings 13, as shown in FIG. 4, with a diamond saw or the like 16. The cut is preferably made in a direction substantially normal to the axes of the fibers 11 allowing a slight protrusion of the fibers 11 to be ground away and polished substantially flush with the respective adjacent end of the fittings 13 as will be described presently. It should be understood, however, that in certain instances and for special applications of use, the fiber 11 ends 15 might be cut at a preselected angle relative to the axes of the fibers to form a prism-like end on the device 10. In so doing, the cut may be made through the material of the fitting 13 along a line 17, for example. In this case, the grinding and polishing of the ends of the fibers 11 to produce an optical finish thereon will simultaneously remove an equal amount of the softer material of the fittings 13. It should also be understood that any of the above-mentioned cuts through the fibers 11 can be made anywhere through the protruding portion 15 of the fibers 11 such as along line 18, for example, if it is desired to utilize this feature of the invention.

After having been cut at a desired location, the resultant end faces of the fibers 11 are optically ground and polished to render them readily receptive to light entering or leaving the said fibers. The grinding and polishing operations are accomplished by pressing the cut end faces of the bundle of fibers 11 against a loose abrasive which is preferably suspended in a suitable vehicle such as water and applied to the flat surface 19 of a rotating or laterally vibrating metallic plate 20 or the like, see FIG. 5. In FIG. 5, the plate 20 is rotated about its axis and the device 10 is held near an edge of the plate 20, as shown. For the grinding, an abrasive such as emery of a preselected grit size would be used and in polishing, a suitable polishing medium such as rouge, for example, would replace the emery. In polishing, a suitable pad of felt or plastic is preferably secured to the upper surface of the plate 20 and the polishing medium is applied to the pad.

It should be understood that various other well-known grinding and polishing techniques may be used to perform the above operations.

In FIG. 6, there is shown a modification of the invention wherein a bundle of light-conducting fibers 21, similar to the above-described fibers 11, are dipped or otherwise coated with an epoxy resin or the like in liquid form and relatively loosely placed within an elongated tube 22 of dilated polyvinyl chloride material. The assembly is then preshaped to a desired configuration of bends and heated to shrink the tube into clamping relation with the fibers while holding the assembly in its preshaped condition. After cooling, the opposite ends of the structure 23 are cut and optically ground and polished in a manner similar to that described above wth relation to the forming of the device 10. The resultant structure 23 then provides a preshaped light pipe which is relatively rigid and shape-retaining throughout its length and has utility in installations where a permanent irregularly shaped light-conducting path is required.

FIG. 7 illustrates a still further modification of the invention wherein an assembly 24 which may be considerably larger in diameter than that of FIG. 6 is formed by shrinking a plastic tube 25 onto a bundle of light-conducting fibers 26 in accordance with the above-described technique. The bundle of fibers, in this case, is aligned and held straight, that is, without the bends shown in FIG. 6 during the application of the tube 25. After the complete assembly is made, fiber optical face plates 24a or others similar units can be cut from the assembly 24, as shown, and optically finished at one or both sides thereof to render the resultant end faces of the fibers 26 readily receptive to light entering and/or leaving the same.

It should be understood that some of the above assemblies may be fabricated without the use of the previously mentioned epoxy resin or other adhesives, if desired. In such cases, the gripping action of the shrunken polyvinyl chloride tubings will relatively efficiently hold the light-conducting fibers in a desired assembled condition.

From the foregoing, it will be seen that efficient and economical means and method have been provided for accomplishing all of the objects and advantages of the invention. Nevertheless, it is apparent that many changes in the details of construction, arrangement of parts or steps in the process may be made without departing from the spirit of the invention as expressed in the accompanying claims and the invention is not to be limited to the exact matters shown and described as only the preferred matters have been given by way of illustration.

Having described our invention, we claim:

1. A fiber energy conducting device of the character described comprising a multiplicity of long and thin normally flexible energy-conducting fibers arranged in side-by-side bundled relationship with corresponding one ends thereof cooperatively defining an end face of said device, a relatively long and resilient tubular sheath surrounding the major portion of the length of said bundle of fibers and extending therealong from a point back away from said end face, a relatively short continuous tubular fitting of initially dilated but heat shrunken plastic material contracted into immediately surrounding relation with at least a substantial portion of the length of said bundle of fibers between said end face and sheath and extending into overlapping relationship with an adjacent section of the length of said sheath, said tubular fitting being in compressively gripping relation with underlying lengths of said fibers and sheath and functioning to continuously apply a substantially uniformly distributed radially directed compressing force along such lengths of the fibers sufficient to prevent longitudinal slippage of one fiber relative to another and relative to said sheath while permitting free flexing of said sheath and fibers throughout sections thereof unsuppported by said fitting.

2. A fiber energy conducting device of the character described comprising a multiplicity of long and thin normally flexible energy-conducting fibers arranged in side-by-side bundled relationship with corresponding opposite ends thereof cooperatively defining energy receiving and emitting opposite end faces of said device, a relatively long and resilient tubular sheath surrounding the major portion of the length of said bundle of fibers and extending therealong between points back away from respective opposite end faces thereof, a relatively short continuous tubular fitting of initially dilated but heat shrunken plastic material contracted into immediately surrounding relation with at least a substantial portion of the length of said bundle of fibers between each of said end faces and corresponding adjacent ends of said sheath, said fittings each extending into overlapping relationship with a section of the length of said sheath and being in such compressively gripping relation with underlying lengths of said fibers and sheath as to continuously apply a substantially uniformly distributed radially directed compressing force along such lengths of the fibers sufficient to prevent longitudinal slippage of one fiber relative to another and relative to said sheath while permitting free flexing of said sheath and fibers throughout intermediate sections thereof unsupported by said fittings.

References Cited by the Examiner

UNITED STATES PATENTS

| 2,027,962 | 1/36 | Currie | 18—59 |
| 2,311,704 | 2/43 | Simison | 29—411 |
| 2,694,661 | 11/54 | Meyer. | |
| 2,825,260 | 3/58 | O'Brien | 88—1 |
| 2,975,785 | 3/61 | Sheldon | 88—1 |

FOREIGN PATENTS 179,905   10/54   Austria.

JEWELL H. PEDERSEN, *Primary Examiner.*

EMILE G. ANDERSON, FREDERICK M. STRADER, *Examiners.*